(12) United States Patent
Nakamura

(10) Patent No.: US 6,301,487 B1
(45) Date of Patent: Oct. 9, 2001

(54) INFORMATION TERMINAL UNIT INCORPORATING CELLULAR PHONE FUNCTION AND ON/OFF-HOOK METHOD

(75) Inventor: Atsunori Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/198,349

(22) Filed: Nov. 24, 1998

(30) Foreign Application Priority Data

Nov. 25, 1997 (JP) .................................................. 9-323265

(51) Int. Cl.[7] .................................................... H04Q 7/20
(52) U.S. Cl. ......................... 455/550; 455/568; 455/569; 379/370
(58) Field of Search ............................. 455/550, 90, 575, 455/100, 569, 568; 379/370, 369, 431

(56) References Cited

U.S. PATENT DOCUMENTS

| | | | |
|---|---|---|---|
| 3,904,843 | * 9/1975 | Kendechy | 200/153 F |
| 4,901,938 | * 2/1990 | Cantley et al. | 242/107.1 |
| 5,475,872 | * 12/1995 | Sato | 455/550 |
| 5,724,667 | * 3/1998 | Furuno | 455/575 |
| 6,002,945 | * 12/1999 | McDuffee | 455/556 |
| 6,011,686 | * 1/2000 | Grasso et al. | 361/686 |
| 6,144,864 | * 11/2000 | Lands et al. | 455/569 |

FOREIGN PATENT DOCUMENTS

| | | |
|---|---|---|
| 2 293 726 A | 4/1996 | (GB) . |
| 4 056530 | 2/1992 | (JP) . |
| 7 107148 | 4/1995 | (JP) . |
| 7-107148 | 4/1995 | (JP) . |
| 7-177208 | 7/1995 | (JP) . |
| 8-111703 | 4/1996 | (JP) . |
| 9-8691 | 1/1997 | (JP) . |
| 9-64952 | 3/1997 | (JP) . |

* cited by examiner

Primary Examiner—William Trost
Assistant Examiner—Congvan Tran
(74) Attorney, Agent, or Firm—McGuireWoods LLP

(57) ABSTRACT

An information terminal unit incorporating a cellular phone function and an ON/OFF-hook method is capable of simplify operating procedure, improve operability. The information terminal unit incorporating a cellular phone function has an information processing terminal portion, a cellular phone portion, a control portion, a cable connected with an earphone microphone for the cellular phone at a tip end portion and connected to an internal circuit of the information terminal unit at the other end, a cable take-up mechanism for taking up the cable, holding means for holding the cable take-up mechanism at an extraction end position of the cable, switch means for closing contacts by the cable take-up mechanism held by the holding means and opening contacts at the cable take-up mechanism, the switching means switching ON-hook and OFF hook of the cellular phone portion.

6 Claims, 10 Drawing Sheets

INFORMATION TERMINAL UNIT INCORPORATING CELLULAR PHONE FUNCTION AND ON/OFF-HOOK METHOD

BACKGROUND OF THE INVENTION

1. Field of the Invention

The present invention relates generally to an information terminal unit incorporating a cellular phone function. More particularly, the invention relates to an ON/OFF-hook method of the information terminal unit incorporating the cellular phone function.

2. Description of the Related Art

Corresponding to spreading of cellular phone system corresponding to personalizing of recent electric communication and personalization of information owing to downsizing and reduction of weight of a portable computer according to development of computer and storage device, information terminal unit incorporating cellular phone function have been developed one after another. Conventionally, most of the information terminal unit incorporating cellular phone function of this kind has directly installed a microphone and a speaker to use with placing a face close thereto similarly to a general cellular phone. In this case, when the information terminal unit is too bulky, a difficulty may be encountered to use like a telephone receiver. Therefore, such type of the information terminal unit is inherently restricted in enlargement of a display portion, in installation of a keyboard and so forth. Therefore, the conventional hand set for cellular phone has been provided in the information terminal unit. However, for enlarged body of the information terminal unit, it is inherent to use a earphone microphone.

For example, in Japanese Unexamined Patent Publication No. Heisei 7-107148, there has been disclosed a cellular phone, in which the earphone microphone also serves as an antenna and the earphone is taken up and stored within a casing.

As ON/OFF-hook method of such cellular phone, a switch for ten key is assigned for this purpose or a dedicated switch is provided.

However, in the conventional cellular phone or the information terminal unit incorporating the cellular phone function, it is typical that a switch for ten key is assigned for this purpose or a dedicated switch is provided. In the cellular phone disclosed in Japanese Unexamined Patent Publication No. Heisei 7-107148, there has been proposed to use an ON-hook switch as well as a take-up operator for releasing engagement between an engaging claw and an engaging plate engaging with the former in a cable storage means. ON-hook is assigned to an icon button.

However, upon call during travel with storing the main body of the information terminal unit within a bag, unwanted trouble should be caused for those around unless response to the call can be done with simple operation. As well, harmful influence should be caused on the user.

SUMMARY OF THE INVENTION

It is an object of the present invention to provide an information terminal unit incorporating a cellular phone function having a cellular phone function with simplified operation procedure and improved operability and an ON/OFF-hook method therefor.

According to the first aspect of the present invention, an information terminal unit incorporating a cellular phone function comprises:

an information processing terminal portion;
a cellular phone portion;
a control portion;
a cable connected with an earphone microphone for the cellular phone at a tip end portion and connected to an internal circuit of the information terminal unit at the other end;
a cable take-up mechanism for taking up the cable;
holding means for holding the cable take-up mechanism at an extraction end position of the cable;
switch means for closing contacts by the cable take-up mechanism held by the holding means and opening contacts at the cable take-up mechanism, the switching means switching ON-hook and OFF hook of the cellular phone portion.

In the preferred construction, the cable take-up mechanism may comprise:

a reel taking up the table to store thereon;
a pinion fixed on the reel in coaxial with a rotary shaft of the reel;
rack gear held for movement with meshing with the pinion and having an engaging portion engaging with an engaging portion of the holding means and a switching operation portion for actuating the switch means in closing direction at the extraction end position of the cable; and
a spring biasing the rack gear in extracting direction of the cable, and the holding means may comprise:

an engaging portion engageable with the engaging portion provided on the rack gear;
an operating portion operable of the holding means from output side of the information terminal unit in engagement releasing direction; and
a spring biasing the engaging portion in an engaging direction.

The rack gear may be a sectorial sector gear pivotably supported. In the alternative, the rack gear may be a linear-type gear slidably supported.

The switch means for switching ON-hook and OFF-hook state of the cellular phone may be a push button switch closing contacts by depression by the switching operation portion provided in the rack gear, a lead switch closing contacts by approaching of the switching operation portion provided in the rack gear, or an optical sensor switch closing contacts by shutting off of an optical path by the switching operating portion provided in the rack gear.

According to the second aspect of the present invention, an information terminal unit incorporating a cellular phone function comprises:

an information processing terminal portion;
a cellular phone portion;
a control portion;
a cable connected with an earphone microphone for the cellular phone at a tip end portion and connected to a plug for electrical connection with the information terminal unit;
a jack provided on a main body of the information terminal unit, electrically connectable with the plug, and having contacts closing upon mating with the plug and opening upon removal of the plug, for switching ON-hook and OFF hook of the cellular phone portion by opening and closing of the contacts.

According to the third aspect of the present invention, an ON/OFF-hook method of a cellular phone in an information terminal unit incorporating a cellular phone function for communication with an earphone, comprises the steps of:

placing a cellular phone portion in the information terminating unit in ON-hook state for establishing call connection in response to external calling in and calling out by extracting the earphone microphone connected with the information terminal unit through a cable from a retracted position housed within the information terminal unit in a predetermined length and holding the cable at the extracted position by holding means; and placing the cellular phone portion in OFF-hook state by depressing an operating portion of the holding means provided in the information terminal unit, retracting the earphone microphone into the information terminal unit.

According to the fourth aspect of the present invention, an ON/OFF-hook method of a cellular phone in an information terminal unit incorporating a cellular phone function for communication with an earphone, comprises the steps of:

placing a cellular phone portion in the information terminating unit in ON-hook state for establishing call connection in response to external calling in and calling out by mating a plug connected to one end of a cable which is connected to the earphone microphone at the other end, which plug establishes electrical connection with an internal circuit of the information terminal unit, with a jack having contacts closing upon mating with the plug; and placing the cellular phone portion in OFF-hook state by releasing the plug from the jack.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIGS. 3A and 3B are diagrammatic illustrations showing a cable take-up mechanism of the first embodiment of an information terminal unit incorporating a cellular phone function according to the present invention, in which FIG. 3A shows a condition upon taking up of an earphone microphone, and FIG. 3B shows a condition upon extracting the earphone microphone;

FIGS. 7A and 7B are diagrammatic illustrations showing a cable take-up mechanism of the fourth embodiment of an information terminal unit incorporating a cellular phone function according to the present invention, in which FIG. 7A shows a condition upon taking up of an earphone microphone, and FIG. 7B shows a condition upon extracting the earphone microphone.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
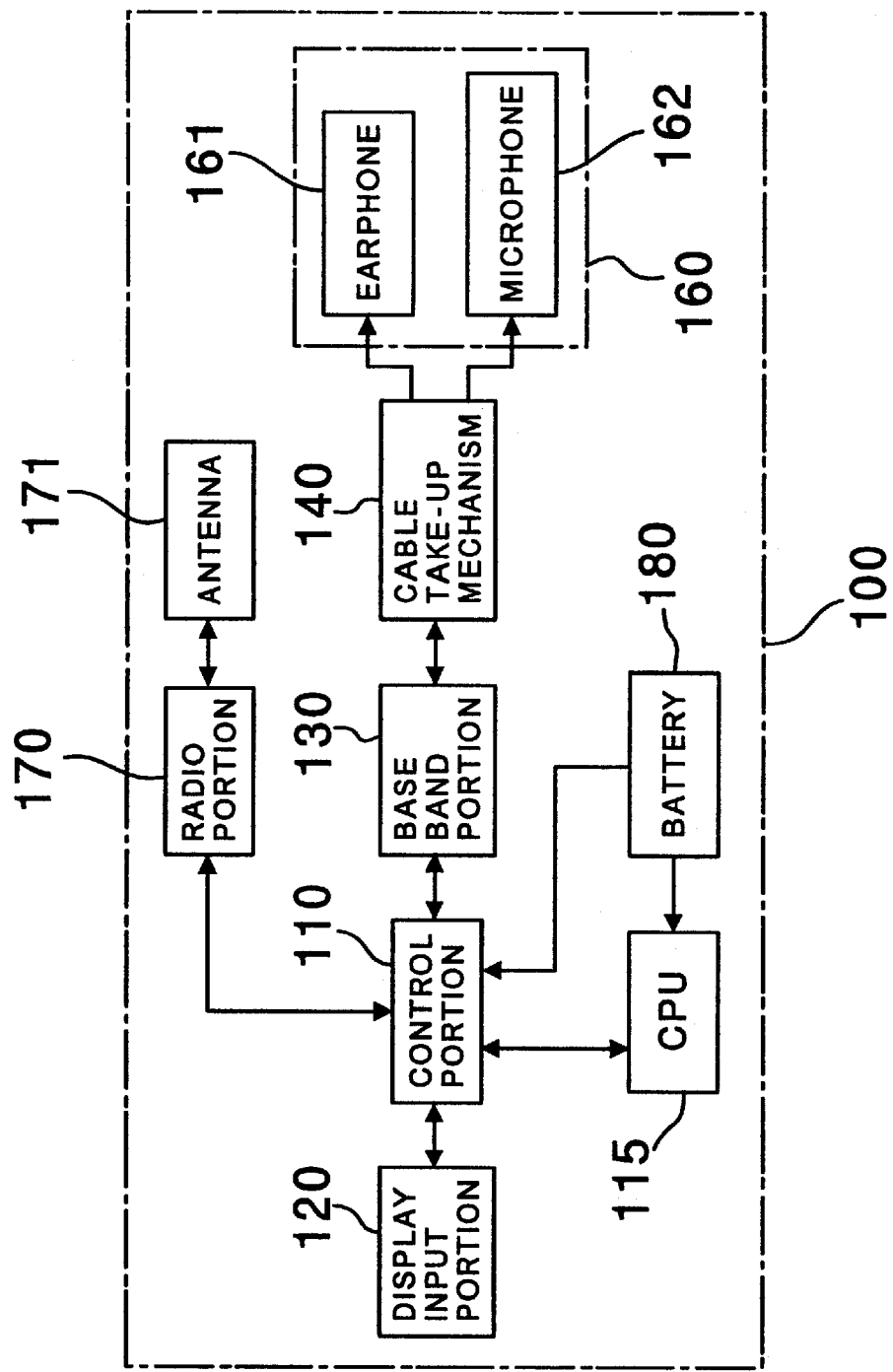
FIG. 1 is a block diagram showing a construction of the first embodiment of an information terminal unit incorporating a cellular phone function according to the present invention.
Figure 2:
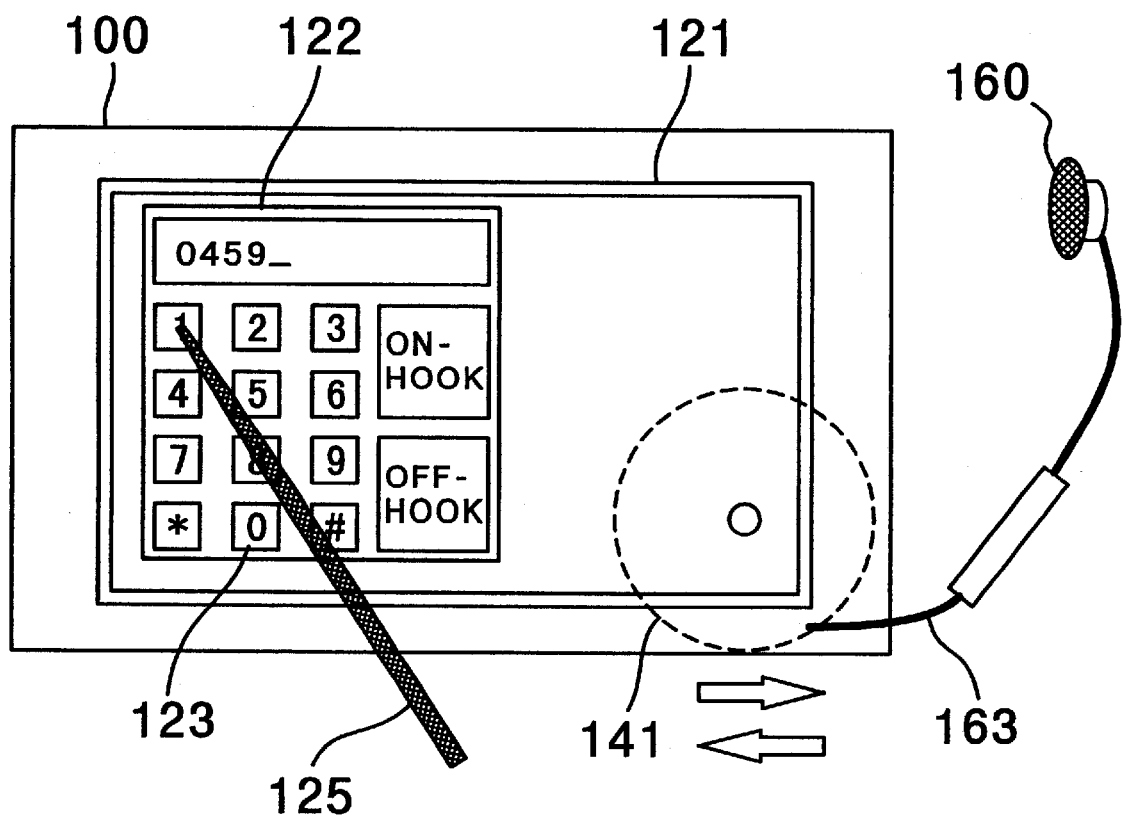
FIG. 2 is a diagrammatic external view of the first embodiment of an information terminal unit incorporating a cellular phone function according to the present invention.
Figure 3A:
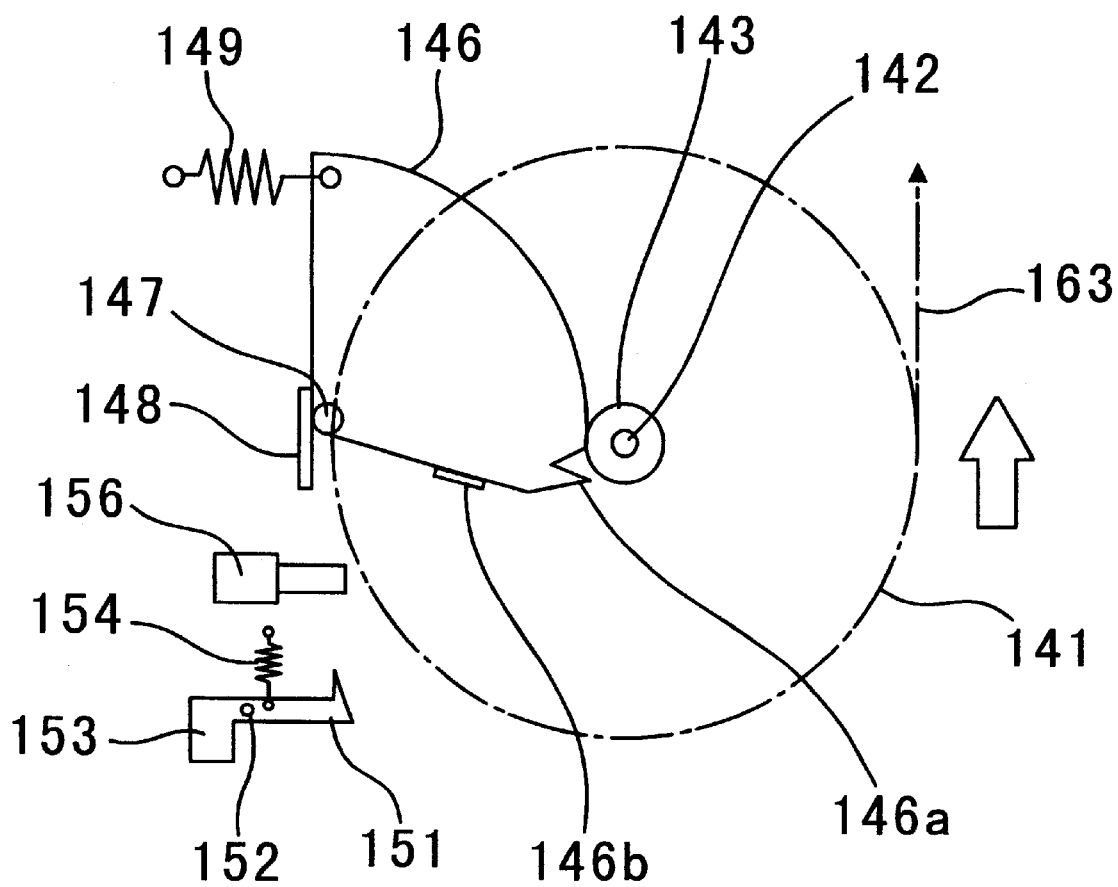
Figure 3B:
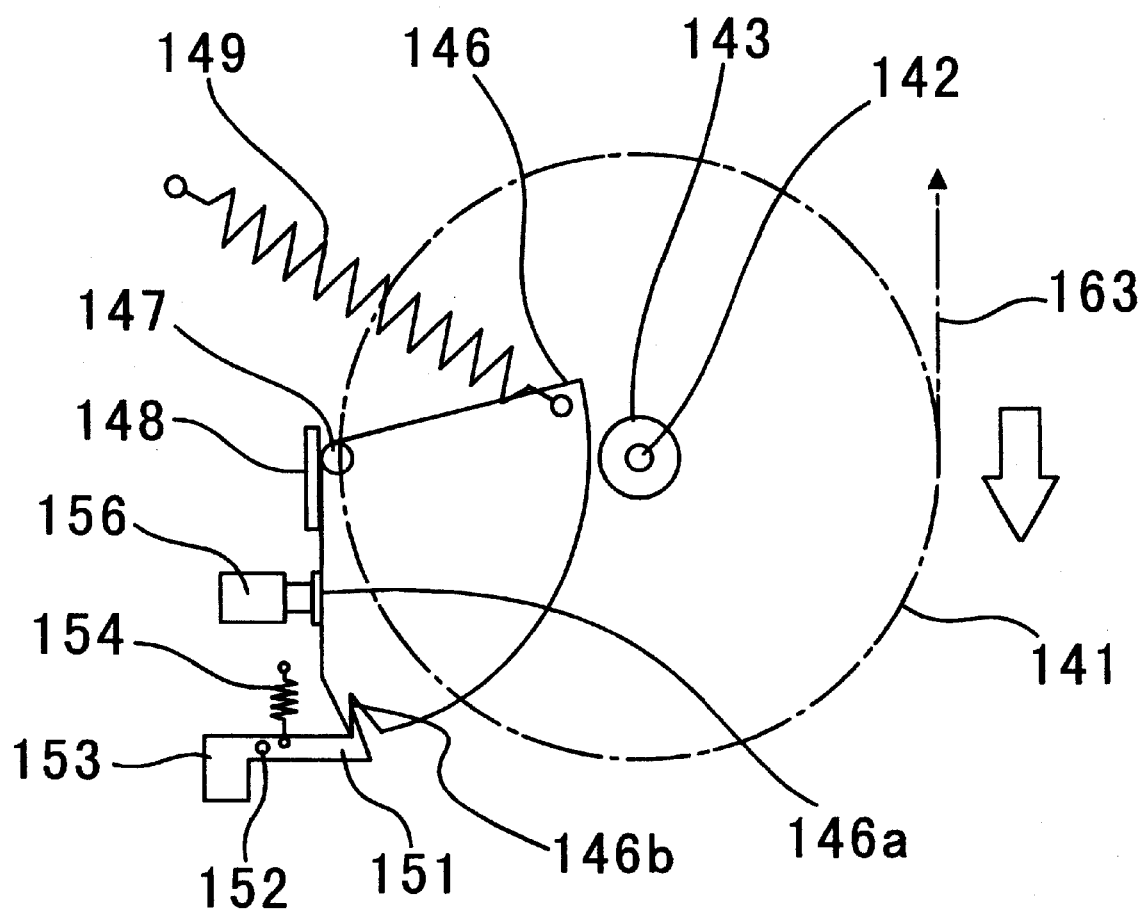

FIG. 1 is a block diagram showing a construction of the first embodiment of an information terminal unit incorporating a cellular phone function according to the present invention, FIG. 2 is a diagrammatic external view of the first embodiment of an information terminal unit incorporating a cellular phone function according to the present invention, and FIGS. 3A and 3B are diagrammatic illustrations showing a cable take-up mechanism of the first embodiment of an information terminal unit incorporating a cellular phone function according to the present invention, in which FIG. 3A shows a condition upon taking up of an earphone microphone, and FIG. 3B shows a condition upon extracting the earphone microphone. In the drawings, the reference numeral 100 denotes an information terminal unit incorporating a cellular phone function, 110 denotes a control portion, 115 denotes CPU, 120 denotes a display input portion, 121 denotes a liquid crystal display portion, 122 denotes a phone function screen, 123 denotes an icon button, 125 denotes a touch pen, 130 denotes a base band portion, 140 denotes a cable take-up mechanism, 141 denotes a reel, 142 denotes a rotary shaft of the reel, 143 denotes a pinion gear, 146 denotes a rack gear, 146a denotes a cut-out portion, 146b is a switch depressing portion, 147 denotes a rotary shaft of the rack gear, 148 denotes a stopper, 149 denotes a spring for the rack gear, 151 denotes a fastening claw, 152 denotes a rotary shaft of the fastening claw, 153 denotes an operation button for the fastening claw, 154 denotes a spring for the fastening claw, 156 is a push button switch, 160 denotes an earphone microphone, 161 denotes an earphone, 162 denotes a microphone, 163 denotes a cable, 170 denotes a radio portion, 171 denotes an antenna, and 180 denotes a battery.

The first embodiment of the information terminal unit 100 incorporating the cellular phone function according to the present invention includes the display input portion 120 both for an information processing terminal and a cellular phone, the control portion 110 controlling an information processing terminal and a cellular phone portion, CPU 115 and a battery 180 serving as a power source.

The display input portion 120 has a liquid display portion 121. In the liquid display portion 121, the telephone function screen 122 including the icon button 123 is formed. The icon button 123 is operated by the touch button 125.

In the cellular phone portion, the antenna 171, the radio portion 170, the base band portion 130, the earphone microphone 160 including the earphone 161 and the microphone 162 and a cable take-up mechanism 140 are provided.

As shown in FIG. 3, the cable take-up mechanism 140 is constructed with a take-up reel 141 for the cable 163, which has the pinion gear 143 coaxially fixed on the rotary shaft 142 and is rotatable by the rotary shaft 142, the sectorial rack gear 146 having the cut-out portion 146a and the switch depressing portion 146b, meshed with the pinion gear 143 and is rotatable with the rotary shaft 147, the spring 149 biasing the rack gear 146 in a take-up direction of the cable 163, the stopper 148 restricting rotation of the rack gear 146 in the cable take-up direction and extracting direction, the fastening claw 151 biased in the engaging direction with the cut-out portion 146a of the rack gear 146 by the spring 154 and engaging with the cut-out portion 146a of the rack gear 146 at the extraction end position of the cable 163, and the push button switch 156 having contacts to be closed by the switch depressing portion 146b of the rack gear 146 at the extraction end position of the cable 163.

Discussing the operation of the conventional information terminal unit incorporating the cellular phone function with reference to FIG. 2, normally, upon use of the telephone function, operation is performed by touching the icon button 123 in the telephone function screen 122 with the touch pen 125. For example, upon calling out, calling out action is taken place in such a manner than, after extraction of the earphone microphone 160, a telephone number is input and then an ON-hook button is touched for establishing call connection. Furthermore, upon termination of call, termination of call is performed by touching an OFF-hook button by the touch pen 125 to return into stand-by state.

Figure 4:
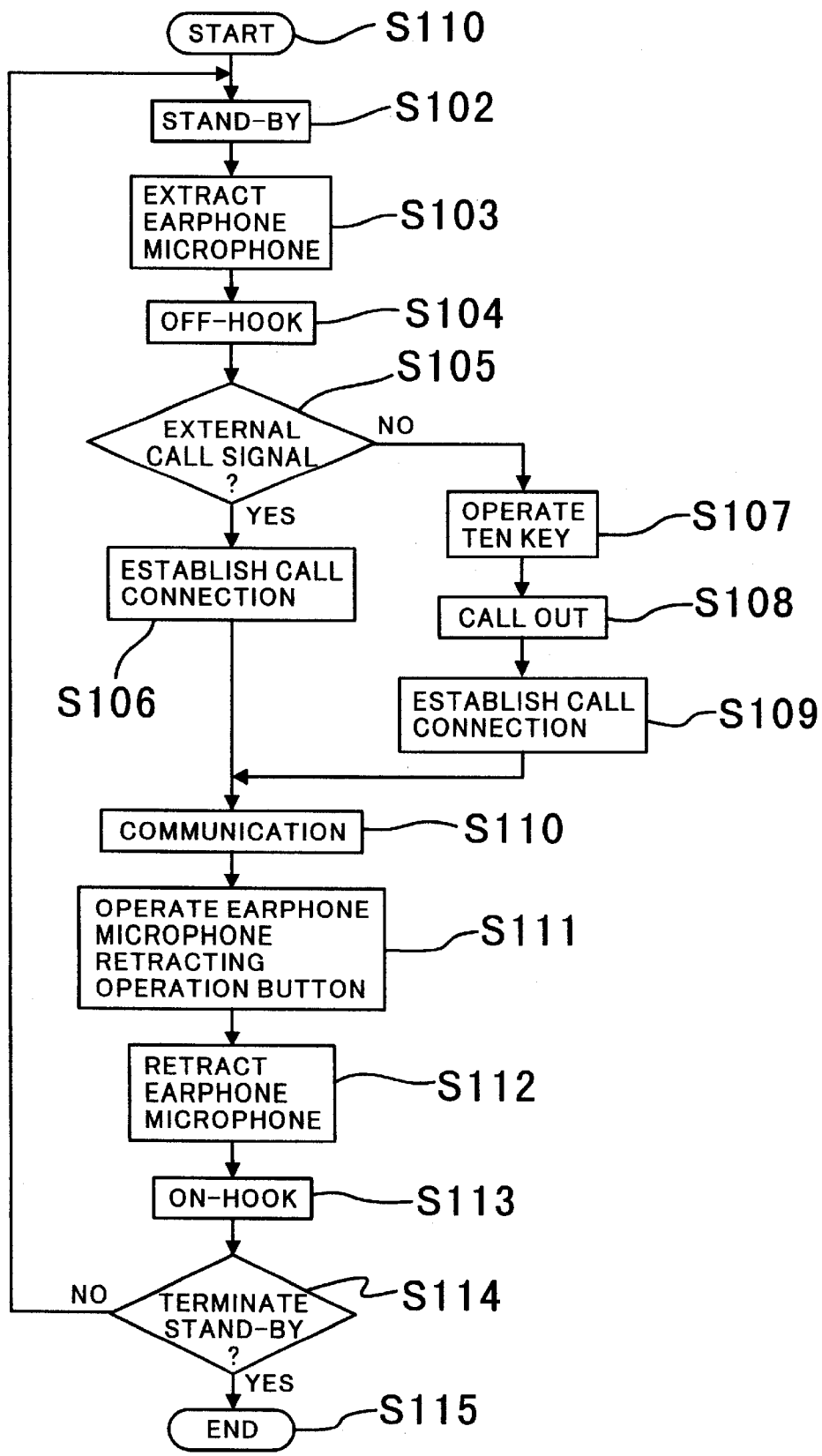
FIG. 4 is a flowchart for explaining ON/OFF-hook method of the first embodiment of the cellular phone according to the present invention.

By ON/OFF-hook system according to the present invention, in addition to use of normal ON/OFF-hook method, ON/OFF-hook operation can be taken place by extraction and retraction of the earphone microphone 160. The detail of the operation will be discussed with reference to FIGS. 3 and 4. FIG. 4 is a flowchart for discussing the ON/OFF hook method of the first embodiment of the cellular phone portion according to the present invention. In the drawing, the reference numerals S101 to S115 represent respective steps in the process shown in FIG. 4.

At first, the information terminal unit 100 incorporating the cellular phone function is started (S101). Then, the cellular phone portion becomes stand-by state (S102). Upon answering to external call or the earphone microphone 160 stored in the terminal device casing is extracted therefrom for external call, the reel 141, on which the cable 163 connected with the earphone microphone 160 is wound, is rotated to drive the pinion gear 143. In response to rotation of the pinion gear 143, the rack 146 is driven to rotate in clockwise direction with expanding the spring 149. Then, the switch depressing portion 146b and the cut-out portion 146a of the rack gear 146 contact with the push button switch 156 and the fastening claw 151 respectively arranged in the vicinity of rotation stop position of the rack gear 146 as restricted by the stopper 148. Furthermore, when the earphone microphone 160 is extracted until the rack gear 146 reaches the rotation stop position defined by the stopper 148, the switch depressing portion 146b of the rack gear 146 depresses the push button switch 156. Also, the fastening claw 151 contacts with the cut-out portion 146a of the rack gear 146. After once rotating in clockwise direction about the rotary shaft 132, the fastening claw 151 engages with the cut-out portion 146a of the rack gear 146 by a tension force of the spring 154 and a tension force of the spring 149 to disable rotation of the rack gear 146 and fixed in place. Here, a condition shown in FIG. 3B is established to close the contacts as switch 154 being depressed, the cellular phone portion becomes ON-hook state to establish call connection (S104).

When the control portion 110 makes judgment that an external call signal is present (Yes at S105) to establish connection with a calling external line (S106) to establish call connection with a calling party (S110). On the other hand, when the control portion 110 makes judgment that an external call signal is not present (No at S105), external call is waited. When a calling number is input by operating the ten key of the icon button 123 by means of the touch pen 125, the control portion 110 makes calling out the external call destination via the radio portion 170 and the antenna 171 (S108) to establish call connection with the external line (S109) to establish call connection with the call destination (S110).

On the other hand, upon termination of call, by pushing up the operation button 153 of the fastening claw 151 (S111), engagement between the fastening claw 151 and the rack gear 146 is released. Then, the rack gear 146 is rotated in counterclockwise direction by the tension force of the spring 149 to transmit rotation to the pinion gear 143. Thus, the cable 163 is taken-up by the reel 141 and whereby the earphone microphone is retracted within the casing of the information terminal unit (S112). At the same time, the push button switch 156 is released to open to place the cellular phone portion in ON-hook state to terminal call (S113). If not the termination of the stand-by state (No at S114), stand-by state at step S102 is returned. If termination of stand-by state is judged (Yes at S114), the process is terminated (S115).

As set forth above, by ON/OFF-hook method according to the present invention, the OFF-hook state is established only by extracting the earphone microphone 160 from the casing of the information termination device. On the other hand, by only operating the earphone microphone retracting operation button 153 at termination of all, ON-hook state is established automatically to simplify operating procedure.

Figure 5:
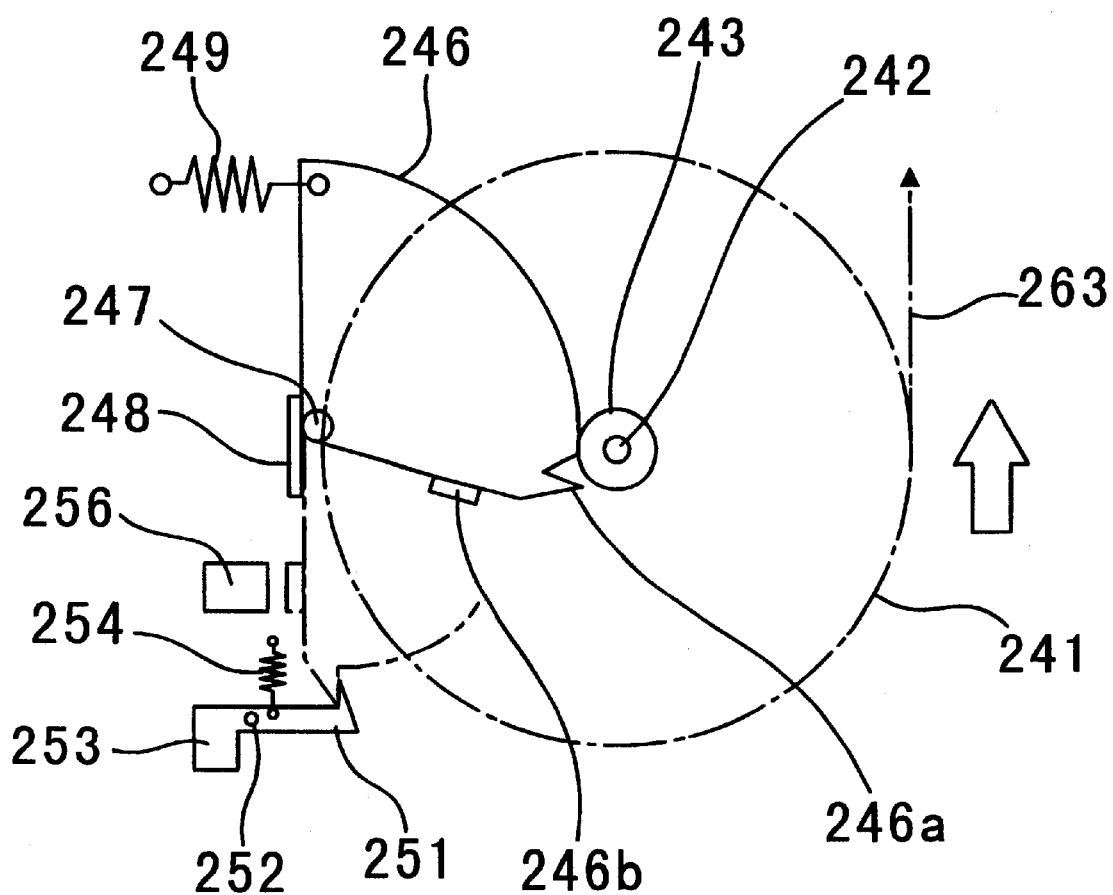
FIG. 5 is a diagrammatic illustration showing a cable take-up mechanism of the second embodiment of an information terminal unit incorporating a cellular phone function according to the present invention.

Next, discussion will be given with respect to the second embodiment of the present invention. FIG. 5 is a diagrammatic illustration showing a cable take-up mechanism of the second embodiment of an information terminal unit incorporating a cellular phone function according to the present invention. In the drawing, the reference numeral 241 denotes a reel, 242 denotes a rotary shaft of the reel, 243 is a pinion gear, 246 is a rack gear, 246a is a cut-out portion, 246b is a magnet, 247 is a rotary shaft of the rack gear, 248 is a stopper, 249 is a spring of the rack gear, 251 denotes a fastening claw, 252 denotes a rotary shaft of the fastening claw, 253 denotes an operation button of the fastening claw, 254 denotes a spring of the fastening claw, 256 denotes a proximity switch, 263 denotes a cable. FIG. 5 shows a condition where the earphone microphone is taken up. A condition where the earphone microphone is partially shown by phantom line in FIG. 5.

In the first embodiment, the push button switch is employed as the switch for ON/OFF-hook operation to be opened and closed by the switch depressing portion provided in the rack gear. In contrast to this, in the second embodiment, as the switch for ON/OFF-hook operation, the proximity switch 256 is employed so that opening and closing is performed by movement of the magnet 246b provided on the rack gear 246 toward and away from the proximity switch 256. Other construction and operation will be similar to those of the first embodiment. Therefore, discussion for components common to the first embodiment will be neglected in order to avoid redundant discussion to keep the disclosure simple enough for facilitating clear understanding of the present invention.

Figure 6:
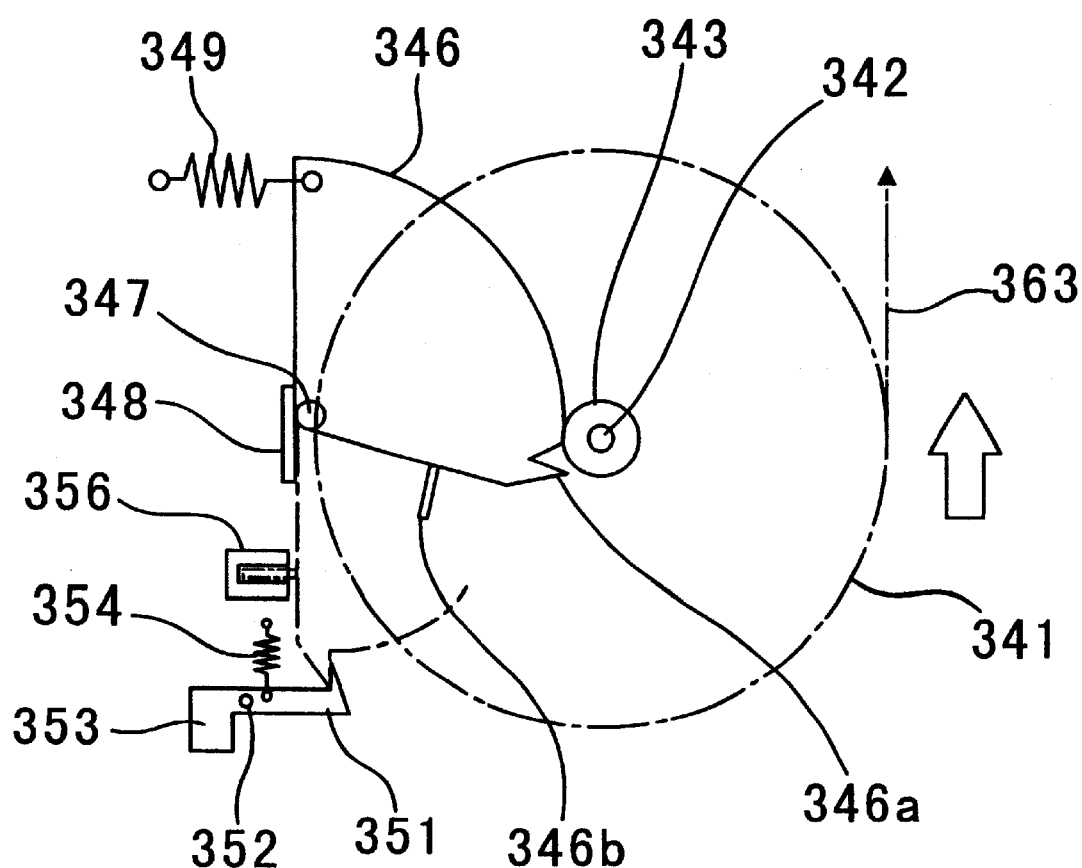
FIG. 6 is a diagrammatic illustration showing a cable take-up mechanism of the third embodiment of an information terminal unit incorporating a cellular phone function according to the present invention.

Next, discussion will be given for the third embodiment of the present invention. FIG. 6 is a diagrammatic illustration showing a cable take-up mechanism of the third embodiment of an information terminal unit incorporating a cellular phone function according to the present invention. In FIG. 6, the reference numeral 341 denotes a reel, 342 denotes a rotary shaft of the reel, 343 denotes a pinion gear, 346 denotes a rack gear, 346a denotes a cut-out portion, 346b denotes a light shielding plate, 347 denotes a rotary shaft of the rack gear, 348 is a stopper, 349 denotes a spring for the rack gear, 351 denotes a fastening claw, 352 denotes a rotary shaft of the fastening claw, 353 denotes an operation button of the fastening claw, 354 denotes a spring of the fastening claw, 356 denotes an optical sensor, 363 denotes a cable. FIG. 6 shows a condition where the earphone microphone is taken up. The condition where the earphone microphone is extracted is partially shown by phantom line.

In the first embodiment, the push button switch is employed as the switch for ON/OFF-hook operation to be opened and closed by the switch depressing portion provided in the rack gear. In contrast to this, in the third embodiment, as the switch for ON/OFF-hook operation, the optical sensor switch 356 is employed. By means of the light shielding plate 346b provided on the rack gear 346, an optical path of the optical sensor switch 356 is shut-off and opened to open and close the switch. Other construction and operation will be similar to those of the first embodiment. Therefore, discussion for components common to the first embodiment will be neglected in order to avoid redundant discussion to keep the disclosure simple enough for facilitating clear understanding of the present invention.

Figure 7A:
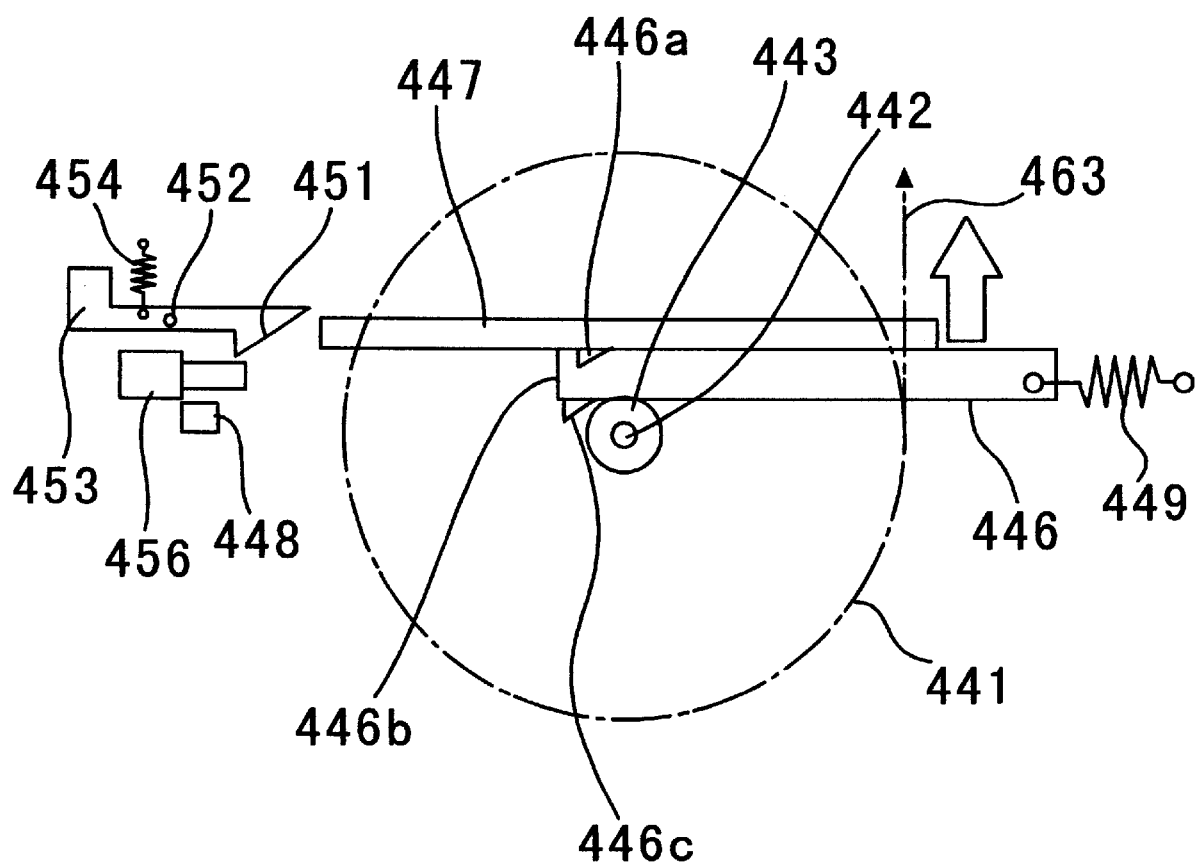

Next, discussion will be given for the fourth embodiment of the present invention. FIG. 7 is a diagrammatic illustration showing a cable take-up mechanism of the fourth embodiment of an information terminal unit incorporating a cellular phone function according to the present invention. In FIG. 7, the reference numeral 441 denotes a reel, 442 denotes a rotary shaft of the reel, 443 denotes a pinion gear, 446 denotes a rack gear, 446a denotes a cut-out portion, 446b denotes a switch depressing portion, 446c denotes a projecting portion, 447 denotes a slide guide, 448 denotes a stopper, 449 denotes a spring of the rack gear, 451 denotes a fastening claw, 452 denotes a rotary shaft of the fastening claw, 453 denotes an operation button of the fastening claw, 454 denotes a spring of the fastening claw, 456 denotes a push button switch and 463 denotes a cable.

In the first embodiment, the sectorial sector rack gear is meshed with the pinion gear integrally rotating with the reel taking up the cable. In contrast to this, in the fourth embodiment, a linear type rack gear 446 slidably held in the slide guide 447 is meshed with the pinion gear 443 which rotates integrally with the reel 441 taking up the cable 463.

As shown in FIG. 7, the cable take-up mechanism is constructed with the reel 441 having the coaxially fixed pinion gear 443 and rotatable with the rotary shaft 442, the linear type rack gear 446 having the cut-out portion 446a, the switch depressing portion 446b and the projecting portion 446c at one end, meshing with the pinion gear 443 and being slidable along the slide guide 447, the spring 449 biasing the rack gear 447 in the take-up direction of the cable 463, the stopper 448 restricting movement of the rack gear 446 in the cable extracting direction, the fastening claw 451 having the operation button 453 capable of external operation for releasing engagement, being biased in a direction for engaging with the cut-out portion 446a of the rack gear 446 by means of the spring for engagement with the cut-out portion 446a of the rack gear 446 at the extraction end portion of the cable, and the push button switch 456 having the contacts to be closed at the extraction end position of the cable 463 by the switch depressing portion 446b of the rack gear 446.

Figure 7B:
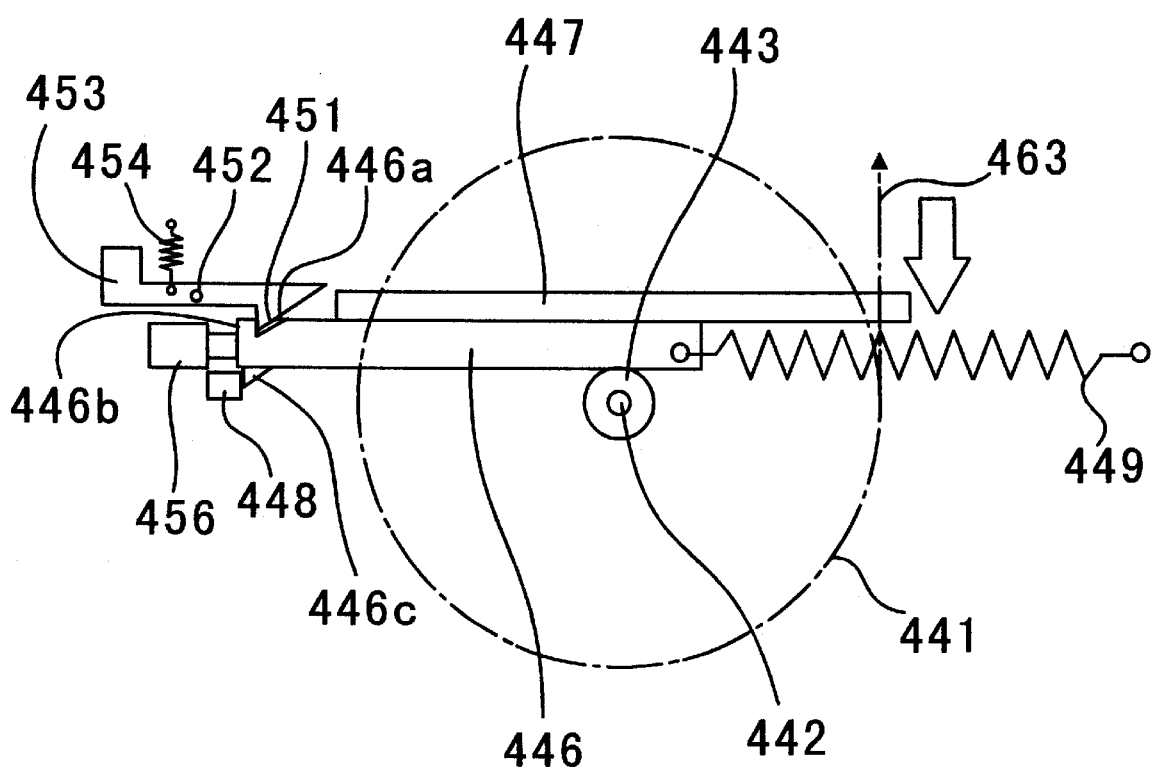

Next, operation will be discussed. In response to external call or in response to extraction of the earphone microphone housed within the casing of the information terminal unit for externally calling out, the reel 441 wound thereon the cable 463 connected to the earphone microphone is rotated. By rotation of the pinion gear 443, the rack gear 446 is moved toward left in FIG. 7 with expanding the spring 449. Next, the switch depressing portion 446b and the cut-out portion 446a of the rack gear 446 contact with the push button switch 456 and the fastening claw 451 arranged in the vicinity of the motion stop position of the rack gear 446 restricted by the stopper 448, respectively. Furthermore, when the earphone microphone is extracted to reach the motion stop position where the stopper 448 and the projecting portion 446c are in contact, the switch depressing portion 446b of the rack gear 446 depressed the push button switch 456, and the fastening claw 451 contacts with the cut-out portion 446a of the rack gear 446. Once running over, the fastening claw 451 engages with the cut-out portion 446a of the rack gear 446 by the tension force of the spring 454 and the tension force of the spring 449 to disable movement of the rack gear 446 to fix in place. Here, a condition shown in FIG. 7B is established. Then, the switch 454 is depressed to close the contacts, the cellular phone portion becomes OFF-hook state to enable call.

When the control portion makes judgment that an external call signal is present to establish connection with a calling external line to establish call connection with a calling party. On the other hand, when the control portion makes judgment that an external call signal is not present, external call is waited. When a calling number is input by operating the ten key of the icon button by means of the touch pen, the control portion 110 makes calling out the external call destination via the radio portion and the antenna to establish call connection with the external line to establish call connection with the call destination.

On the other hand, upon termination of call, by pushing up the operation button 453 of the fastening claw 451, engagement between the fastening claw 451 and the rack gear 446 is released. Then, the rack gear 446 is moved toward right in FIG. 7 by the tension force of the spring 449 to transmit rotation to the pinion gear 443. Thus, the cable 463 is taken-up by the reel 441 and whereby the earphone microphone is retracted within the casing of the information terminal unit. At the same time, the push button switch 456 is released to open to place the cellular phone portion in ON-hook state to terminal call.

Even in the fourth embodiment, as in the second and third embodiments, the push button switch may be replaced with the proximity switch or optical sensor switch.

While the foregoing embodiments have been discussed in terms of the method to take-up the cable of the earphone microphone on the reel, the cable take-up method has been widely used in electric cleaner and so forth, for example. It is therefore obvious to those skilled in the art to combine such known cable take-up method with the cable take-up mechanism according to the present invention. In such case, suitable switch adapted to the take-up method as employed may be selected for switching ON/OFF-hook states.

Figure 8:
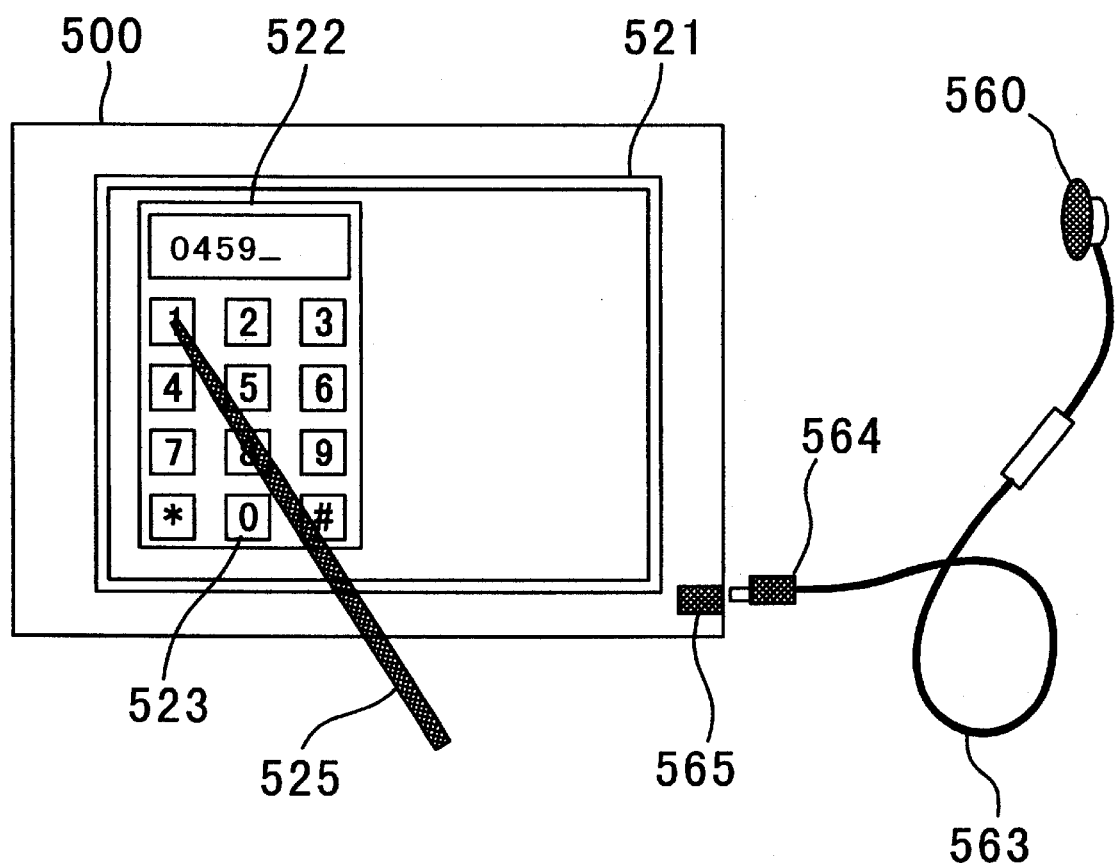
FIG. 8 is a diagrammatic external view of the fifth embodiment of the information terminal unit incorporating the cellular phone function of the present invention.

Next, discussion will be given for the fifth embodiment of the present invention with reference to FIG. 8. FIG. 8 is a diagrammatic external view of the fifth embodiment of the information terminal unit incorporating the cellular phone function according to the present invention. In FIG. 5, the reference numeral 500 denotes the information terminal unit incorporating the cellular phone function, 520 denotes a display input portion, 521 denotes a liquid crystal portion, 522 denotes a telephone function screen, 523 denotes an icon button, 525 denotes a touch pen, 560 denotes an earphone microphone, 563 denotes a cable, 564 denotes a plug, 565 denotes a jack.

Referring to FIG. 8, in place of the reel taking up the earphone microphone 560, the plug 564 is provided in the earphone microphone 560. On the other hand, on the side of the main body, a jack 565 with a switch is provided. Namely, the earphone microphone 560 is of detachable type.

Next, operation of the fifth embodiment of the present invention will be discussed. When the plug 564 is inserted into the jack 565 with the switch, the switch is turned ON by mating the plug with the jack to place the cellular phone portion into OFF-hook state. On the other hand, by withdrawing the plug 564, the switch is turned OFF, the cellular phone portion is placed into ON-hook state. Namely, control of ON/OFF-hook function is controlled by inserting and withdrawing of the earphone microphone 560. Of course, the plug 564 and the jack establishes electrical connection between the earphone microphone 560 and the wiring in the main body of the information terminal unit.

With the construction set forth above, it becomes unnecessary to provide the reel in the main body of the information terminal unit to contribute for down-sizing and reduction of weight of the information terminal unit.

As set forth above, with the present invention, upon calling out and calling in, call connection can be quickly and easily established. Namely, since the ON/OFF-hook function can be operated by extracting and retracting the earphone microphone from and into the main body of the information terminal unit, call can be established quite easily. Particularly, in case of calling in, it becomes unnecessary to check the display portion, and also operation by the touch pen or so forth becomes unnecessary to reduce operation process up to establishment of call connection. On the other hand, even when a physical button for operating ON/OFF-hook function, operation of button can be neglected.

On the other hand, according to the present invention, power saving can be achieved. Namely, since physical switching operation is performed, it becomes unnecessary to display icon buttons, a power to be consumed by the display function can be reduced.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An information terminal unit incorporating a cellular phone function comprising:

an information processing terminal portion;

a cellular phone portion;

a control portion for controlling said information processing terminal portion and said cellular phone portion;

a cable connected with an earphone microphone for said cellular phone at a tip end portion and connected to an internal circuit of said information terminal unit at the other end;

a cable take-up mechanism far taking up said cable;

holding means for holding said cable take-up mechanism at an extraction end position of said cable;

switch means for closing contacts by said cable take-up mechanism held by said holding means and opening contacts at said cable take-up mechanism, said switching means switching ON-hook and OFF hook of said cellular phone portion, wherein said cable take-up mechanism comprises:
a reel for taking up said cable to store thereon;
a pinion fixed on said reel coaxial with a rotary shaft of said reel;
rack gear held for movement with meshing with said pinion and having an engaging portion engaging with an engaging portion of said holding means and a switching operation portion for actuating said switch means in closing direction at the extraction end position of said cable; and
a spring biasing said rack gear in extracting direction of said cable, and said holding means comprises:
an engaging portion engageable with said engaging portion provided on said rack gear;
an operating portion operable of said holding means from output side of said information terminal unit in engagement releasing direction; and
a spring biasing said engaging portion in an engaging direction.

2. An information terminal unit incorporating a cellular phone function as set forth in claim 1, wherein said rack gear is a sectorial sector gear pivotably supported.

3. An information terminal unit incorporating a cellular phone function as set forth in claim 1, wherein said rack gear is a linear-type gear slidably supported.

4. An information terminal unit incorporating a cellular phone function as set forth in claim 1, wherein said switch means for switching ON-hook and OFF-hook state of said cellular phone is a push button switch closing contacts by depression by said switching operation portion provided in said rack gear.

5. An information terminal unit incorporating a cellular phone function as set forth in claim 1, wherein said switch means for switching ON-hook and OFF-hook state of said cellular phone is a lead switch closing contacts by approaching of said switching operation portion provided in said rack gear.

6. An information terminal unit incorporating a cellular phone function as set forth in claim 1, wherein said switch means for switching ON-hook and OFF-hook state of said cellular phone is an optical sensor switch closing contacts by shutting off of an optical path by said switching operating portion provided in said rack gear.

* * * * *